Patented Feb. 18, 1941

2,232,164

UNITED STATES PATENT OFFICE 2,232,164

PIGMENT MATERIAL AND METHOD OF PRODUCING THE SAME

Howard K. Carter, Marshallton, Del., assignor to E. I. du Pont de Nemours & Company, Wilmington, Del., a corporation of Delaware No Drawing. Application June 3, 1939, Serial No. 277,256

14 Claims. (Cl. 134—58)

This invention relates to improved pigment materials and to processes of making the same. More particularly it relates to the treatment of pigment materials, especially white inorganic pigment materials comprising white, inorganic, relatively water insoluble compounds of calcium, such as anhydrite and gypsum, with benzenecarboxylic acid and salts thereof.

It is well known in the art that oleaginous coating compositions comprising such pigment materials as titanium dioxide, lithopone, zinc sulfide, and the like, and particularly oleaginous coating compositions comprising high index of refraction white pigment materials such as titanium dioxide, zinc sulfide, and the like extended with such inorganic compounds of calcium as calcium sulfate, calcium carbonate, calcium sulfite, and the like, exhibit poor gloss and poor gloss retention characteristics, i. e., they produce films on wood, metal, oil cloth, linoleum, paper, and the like, which have an objectionably dull, matte appearance. Furthermore, it is well known in the art that organic coating compositions comprising calcium sulfate, for example, anhydrite extended titanium dioxide pigments, have the undesirable property of being very sensitive to water, i. e., their viscosity is increased to an undesirable extent when said coating compositions are prepared or applied under conditions of high atmospheric humidity, or if small amounts of water are added thereto. In addition, white inorganic pigment materials, particularly those comprising white inorganic compounds of calcium, exhibit gradual color changes such as yellowing when employed in such organic compositions as those of oil, gum, varnishes, rubber, plastics, and the like. Moreover, oleaginous coating compositions, such as paints and enamels comprising titanium dioxide, and particularly calcium sulfate extended titanium dioxide, suffer loss of drying on storage, i. e., said coating compositions after storage for a period of about 6 months or more, as in cans in a warehouse, provide films which dry much more slowly than do those of the freshly prepared coating compositions. Furthermore, said compositions on storage tend to settle to a dense, hard cake which may only be reincorporated in the oleaginous vehicle with difficulty, if at all. Moreover, such pigments often exhibit poor wetting characteristics and poor dispersion properties when incorporated in the aforementioned compositions. While a substantial improvement in the art with respect to the mixing and dispersion of lithopone in paint vehicles, for example, is disclosed in U. S. Patent 1,722,174, such pigment treatments produce pigments which cause an undesirable increase in the consistency or viscosity of coating compositions in which they are formulated.

This invention has as an object the production of pigment materials, particularly white pigment materials comprising white inorganic compounds of calcium, which exhibit improved gloss and improved gloss retention characteristics in organic coating compositions. A further object is the production of pigment materials which exhibit improved wetting, mixing, and dispersion characteristics in oil, gum, varnish, plastics, and rubber compositions, without producing the increased consistency effected by prior art dispersing pigments. A still further object is the production of white pigments which exhibit improved film color in dried organic coating composition films. A still further object is the production of white inorganic pigment materials having superior tint retention as well as high resistance toward discoloration and yellowing in oils, gums, varnishes, plastics, rubber and the like. A still further object is the production of calcium sulfate comprising pigments of reduced water sensitivity, i. e., the provision of calcium sulfate comprising pigments which in organic coating compositions produce coating compositions whose viscosity is little affected by the addition of small amounts of water or by atmospheric humidity. A still further object is the production of titanium oxide pigments and particularly calcium sulfate extended titanium dioxide which, when formulated in oleaginous coating compositions, and after storage of said compositions, provide films which dry as rapidly as do comparable freshly prepared compositions comprising prior art titanium oxide pigments. A still further object is the provision of pigments which in organic coating compositions do not settle to a dense hard cake. Additional objects will become apparent from an examination of the following description and claims.

These and other objects and advantages are accomplished according to the following invention which broadly comprises adding to a pigment material between about 0.05% and about 2%, calculated as benzenecarboxylic acid and based upon the weight of the pigment, of benzenecarboxylic acid or salts thereof.

In a more restricted sense this invention comprises adding to a white inorganic pigment material between about 0.1% and about 1%, calculated as benzenecarboxylic acid and based upon the weight of the pigment, of benzenecarboxylic acid or salts thereof.

The preferred embodiment of this invention comprises adding between about 0.25% and about 0.75%, calculated as benzenecarboxylic acid and based upon the weight of the pigment, of benzenecarboxylic acid or salts thereof, to a white inorganic compound of calcium, preferably a calcium sulfate containing pigment, and subsequently dry-milling said treated pigment material. In carrying out my invention I prefer to employ either benzenecarboxylic acid, sodium benzenecarboxylate, or zinc benzenecarboxylate.

Various arrangements and selections of equipment for the operation of my process are possible. In the preferred arrangement, however, I feed benzenecarboxylic acid in the amount of from about 0.25% to about 0.75%, based upon the weight of the pigment, to a calcined pigment material and thereafter dry-mill said treated pigment material by passing it through a pulverizer, such as a ring roll mill equipped with air separator, and then through a disintegrator, such as a rotary hammer mill.

The following examples are given for illustrative purposes and are not intended to place any restrictions or limitations on the herein described invention.

*Example I*

Benzenecarboxylic acid (benzoic acid) was added to a 70% $CaSO_4$—30% $TiO_2$ pigment at the rate of 15 lbs. per hour as said pigment was being fed at the rate of 3000 lbs./hr., into a 50 inch ring roll mill equipped with air separator, i. e., the benzenecarboxylic acid was added in the amount of 0.5% on the basis of the weight of the pigment. After the pigment was pulverized in said ring roll mill at the aforementioned rate it was disintegrated by passing it through a 24 in. rotary hammer mill, also at a rate of 3000 lbs./hr. The resultant treated pigment obtained by my novel process was definitely superior in fineness and in wetting, mixing, suspension, viscosity, drying, yellowing, and gloss characteristics, in organic coating composition vehicles, to a 70% $CaSO_4$—30% $TiO_2$ pigment identical in all respects and prepared and dry-milled in exactly the same manner as the novel pigment of my invention except that it was not treated with added benzenecarboxylic acid. Furthermore, the novel pigment of my invention was definitely superior in wetting, mixing, suspension, viscosity, drying, yellowing, and gloss characteristics, in organic coating composition vehicles, and was equal in fineness, to a comparable untreated 70% $CaSO_4$—30% $TiO_2$ pigment which was dry-milled at a much lower rate, i. e., was passed through the 50 in. ring roll mill and then the 24 in. rotary hammer mill at a rate of but 2000 lbs./hr.

*Example II*

20 lbs. of benzenecarboxylic acid was dissolved in 80 lbs. of carbon tetrachloride and the resultant solution was sprayed on 4000 lbs. of a titanium calcium pigment consisting of 30% titanium dioxide and 70% calcium sulfate, said solution being added to said pigment immediately after the calcination operation in the manufacture of said pigment. Subsequently, the aforementioned treated pigment was dry-milled by passage at the rate of 2000 lbs./hr. through a 50 in. ring roll mill equipped with air separator and then through a 24 in. rotary hammer mill in series. A prior art 30% titanium dioxide/70% calcium sulfate pigment was made by dry milling a portion of the aforementioned calcined pigment in exactly the same manner except that the treatment with benzenecarboxylic acid was omitted.

When formulated in a linseed oil enamel the prior art pigment produced an enamel which formed dry films of fair color and gloss. However, after a one month exposure to north light said films yellowed to a very undesirable extent and were no longer glossy. The product of my invention, formulated in the same manner as the prior art pigment, produced dry enamel films having good color and gloss which after one month exposure to north light were definitely superior, being very much less yellow and having very much better gloss than the exposed films comprising the prior art pigment. When freshly prepared, the aforementioned coating compositions comprising the prior art pigment and the novel pigment of this invention respectively, dried to hard films within a period of four hours when brushed out on a wood surface. However, after said compositions had been stored in cans for a period of 6 months, the composition comprising the prior art pigment, when brushed out in the aforementioned manner, did not dry to a hard film within a period of 12 hours, whereas the composition comprising the novel pigment of this invention dried to a hard film within a period of 4 hours. Moreover, in the aforesaid compositions, the prior art pigment had settled to a dense hard cake upon storage for a period of 6 months and said cake could be reincorporated in the oleaginous vehicle only with the greatest difficulty. On the other hand, the composition comprising my treated pigment had only settled to a loose bulky cake which could be reincorporated in the oleaginous vehicle easily by simple stirring. When formulated in a flat paint composition, comprising 0.5% water by volume, the treated pigment of my novel process produced a paint having a viscosity, as measured on the stormer viscometer illustrated at page 575 of the 8th (January, 1937) edition of "Physical and Chemical Examination of Paints, Varnishes, Lacquers and Colors," by Henry A. Gardner, which was 70% lower than that of a corresponding flat paint composition made with the prior art pigment. The former paint was eminently suited for interior wall painting whereas the latter paint, comprising prior art pigment, was too viscous for practical application.

*Example III*

0.125 lb. of benzenecarboxylic acid and 25 lbs. of a titanium calcium pigment, consisting of 30% titanium dioxide and 70% calcium sulfate, were pulverized for 20 minutes in an edge runner mill thereby effecting complete dissemination of the treating agent throughout the pigment. The treated pigment was subsequently disintegrated by passage through a squirrel cage disintegrator. A 25 lb. control sample of the same titanium calcium pigment was also pulverized for 20 minutes in an edge runner mill without addition of the benzenecarboxylate compound, and was disintegrated by passage through a squirrel cage disintegrator. The treated pigment of my novel process was definitely superior to the untreated control pigment in fineness, wetting, mixing, suspension, viscosity, drying, yellowing, and gloss characteristics. The fineness improvement amounted to a decrease of 85% in the number of grit particles per unit area of paint film. The improvement in wetting of the pigment in the paint vehicle, as indicated by the length of mixing time required in a pony mixer to obtain a free flowing mixture of pigment and vehicle at both high and low atmospheric humidity, are tabulated below:

| Pigment | Mixing time to flow (minutes) | | |
|---|---|---|---|
| | 50% humidity | 90% humidity | |
| | Formulation A* | Formulation A* | Formulation B** |
| Untreated control pigment | 2.0 | 79.0 | 23.0 |
| Treated pigment | 0.7 | 0.4 | 0.3 |

*Formulation A consisted of 489 grams pigment and 207 grams linseed oil comprising vehicle.
**Formulation B consisted of 600 grams pigment and 190 grams of China-wood oil—linseed oil—ester gum varnish.

Example IV

A sample of low oil absorption lithopone was slurried in 2 parts by weight of water, heated to about 50° C., and treated with 0.5% of benzenecarboxylic acid. After thorough mixing the slurry was adjusted to about 9.5 pH with a dilute solution of sodium hydroxide. The treated slurry was then filtered, dried, and the dried pigment disintegrated by passage through a squirrel cage disintegrator. A control sample was finished in exactly the same manner with the exception of the benzenecarboxylic acid treatment, and both pigments were tested in parallel. The treated pigment had much better wetting and dispersing properties in paints than did the untreated pigment and, furthermore, produced paints which had no higher consistencies than did those containing untreated pigment. On the other hand, when a water soluble soap, such as sodium oleate, was substituted for the benzoic acid in the above process, the resultant pigment produced paints of undesirably high consistencies.

Example V

A mixture of 25 lbs. of calcined titanium dioxide and zinc benzenecarboxylate in an amount equivalent to 0.125 lb. benzenecarboxylic acid was dry-milled for 20 minutes in an edge runner mill. The treated pigment was subsequently disintegrated by passage through a squirrel cage disintegrator. A 25 lb. control sample of the same titanium dioxide was also dry-milled for 20 minutes in an edge runner mill without addition of the benzenecarboxylate compound and was disintegrated by passage through a squirrel cage disintegrator. The treated pigment of my novel process was definitely superior to the untreated control pigment in fineness, wetting, mixing, suspension, viscosity, drying, yellowing, and gloss characteristics.

It is to be understood that the hereinbefore disclosed specific embodiments of my invention may be subject to variation and modification without departing from the scope thereof. For instance, while the added material must be intimately associated with and form a surface coating on the individual particles of the novel pigment products of my process, the agent may be added to said pigments in a variety of ways. As hereinbefore stated, the preferred method of treatment is to add the agent to the dry pigment and thereafter to dry-mill the treated pigment by subjecting it to a pulverizing process, preferably in a pulverizing mill equipped with air separator, and then to a disintegrating process. Pulverizing is defined at page 664 of the second edition of "Industrial Chemistry" by Emil Raymond Riegal, 1933, as the reduction of coarse powder to an impalpable powder and is accomplished in ring roll mills, edge runner mills, pebble mills, Buhr stone mills, and the like. On the other hand, disintegrating is defined by Emil Raymond Riegal, in the reference cited above, as the reduction of egg and nut sizes to a coarse powder and is accomplished in rotary hammer mills, squirrel cage disintegrators, and the like. On account of the superior results ordinarily obtained thereby, I prefer to effect pulverizing in a ring roll mill equipped with air separator, and to effect subsequent disintegration in a rotary hammer mill. However, I may practice the herein described invention by adding the agent to the pigment material and thereafter dry-milling said treated material by any of the dry-milling processes well-known in the art. Furthermore, the agent may be added to a dry pigment material which has been pulverized, and thereafter said agent may be mixed intimately with said pulverized pigment by disintegration of the treated pigment. Again, the treating agent, as for example benzenecarboxylic acid, may be dissolved in a low boiling point organic liquid, such as carbon tetrachloride, and may be sprayed on unground or pulverized pigments and thereafter intimately mixed with said pigments by dry-milling, such as by pulverizing followed by disintegrating, or by disintegrating alone. In another embodiment of my invention, said treating agent may be mixed with an aqueous suspension of the pigment and the pigment suspension thereafter dewatered, dried, and made ready for use by dry-milling.

Although sodium benzenecarboxylate and zinc benzenecarboxylate are my preferred salts, it is to be understood that my invention is not limited thereto. Thus, other salts of benzenecarboxylic acid may be employed such as potassium benzenecarboxylate, ammonium benzenecarboxylate, magnesium benzenecarboxylate, cobalt benzenecarboxylate, calcium benzenecarboxylate, barium benzenecarboxylate, and the like.

It is to be understood that the amount of material which is added, according to my herein described invention, is critical to the results which are obtained. I have found that appreciable beneficial effects are had only when the amount is within the range of about 0.05% and about 2%, calculated as benzenecarboxylic acid and based upon the weight of the pigment. If an amount in substantial excess of 2% is used, for example 3% or more, the beneficial results of this invention sharply diminish until a point is reached where the treating agent is actually detrimental to the pigment properties. In most instances, I prefer to employ an amount in the range of from about 0.1% to about 1%, and for optimum results in an amount in the range of from about 0.25% to about 0.75%, calculated as benzenecarboxylic acid and based upon the pigment weight.

The herein described invention is applicable to all types of pigment materials consisting in whole or in part of such commodities or admixtures of such commodities as white pigment materials, such as titanium dioxide, extended titanium dioxide pigments, titanates of divalent metals, zirconium oxide, lithopone, zinc sulfide, zinc oxide, antimony oxide, white lead, and the like, comprising prime white pigments such as $Sb_2O_3$, $2PbCO_3 \cdot Pb(OH)_2$, $PbSO_4 \cdot PbO$, $PbSO_4$, $CaTiO_3$, $MgTiO_3$, $ZnTiO_3$, $ZnO$, $ZnS$, $ZrO_2$, and the like, as well as white extender materials such as anhydrite, gypsum, barium sulfate, calcium carbonate, calcium sulfite, barium carbonate, silica, aluminum silicate, aluminum oxide, magnesium fluoride, sodium fluoride, aluminum fluoride, sodium fluosilicate, sodium aluminum fluoride, magnesium fluosilicate, pachnolite, calcium fluoride, and the like, and also organic lakes and toners such as lithol reds, toluidine reds, and para reds as well as inorganic colored pigments, such as ultramarine blue, chrome yellow, basic zinc chromate, chrome red, chrome orange, chrome green, barium chromate, iron blue, earth colors such as iron oxide, and the like. However, it is to be understood that the herein described invention is particularly applicable to pigment materials consisting in whole or in part of such commodities or admixtures of such commodities as white, inorganic, relatively water insoluble compounds of calcium, particularly anhydrite and gypsum. Furthermore, my process is of greatest industrial importance in the treatment of white pigment materials, particularly titanium dioxide and zinc sulfide, extended with calcium sulfate materials selected from the class consisting of anhydrite and gypsum.

It is to be understood that in the case of such pigment materials as titanium dioxide, lithopone, anhydrite, and the like, which are calcined during the process of manufacture of said pigment materials, the treating agent is added to the calcined pigment material and not to the pigment material before the calcination operation.

My process possesses advantages not previously combined in a single process. Furthermore, the products of my process possess advantages not previously combined in a pigment material. For example, my novel process allows the production of pigment materials, particularly calcium sulfate comprising pigment materials, which in oleaginous coating compositions produce films of excellent gloss. Furthermore, such films on wood, metal, and the like, retain this property of high gloss for a remarkably long period of time when exposed to atmospheric conditions. In addition, said white oleaginous films comprising white inorganic pigment materials, especially calcium sulfate extended pigments, have much better color than those heretofore obtained with corresponding prior art pigments. Moreover, the products of my novel process, because of their superior fineness, permit paint manufacturers, for example, to effect appreciable savings in their paint grinding process. Ordinarily, more than from about 15% to about 20% of the novel 30% TiO₂—70% CaSO₄ pigment of my invention, than of prior art corresponding pigment, can be mixed with a given quantity of paint vehicle in preparing a grinding paste suitable for grinding in paint pebble mills, paint roller mills, and the like, thus increasing the capacity of said paint pebble mills, or said paint roller mills, by at least about 15%. Furthermore, when said grinding pastes are reduced after grinding, to painting consistency by addition of more vehicle to obtain the usual pigment/vehicle ratios, the consistencies of the paints comprising the novel products of my invention are substantially equal to those of the paints comprising corresponding prior are untreated pigment. Moreover, the fineness of my novel pigments are such that in many instances the paint grinding step may be omitted and acceptable paints may be had by simple mixing of pigment and vehicle. Moreover, the pigment products of my process possess definitely improved yellowing resistance in organic compositions such as oils, gums, varnishes, plastics, rubber, and the like, in comparison to the yellowing resistance in such compositions of comparable pigments manufactured by prior art processes. My improved pigment also exhibits improved wetting, mixing, and dispersion characteristics, in oils, gums, varnishes, plastics, and rubber compositions, without producing the increased consistency obtained with prior art dispersing pigments. In addition, the novel pigments of this invention, when employed in oleaginous coating compositions, do not settle on storage, as in cans in a warehouse, to a dense, hard cake, difficult to reincorporate in the oleaginous vehicle, as do comparable prior art pigments. Furthermore, after storage, said compositions provide films which dry rapidly, in contrast with those comprising prior art pigments, particularly prior art titanium dioxide, which under such conditions produce films which dry extremely slowly. In addition, calcium sulfate comprising pigments, treated according to my invention, exhibit markedly decreased water sensitivity characteristics in paints and the like.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. In a process for the production of improved pigments the steps which comprise adding to a pigment material between about 0.05% and about 2%, calculated as benzenecarboxylic acid and based upon the weight of said pigment material, of a member selected from the group consisting of benzenecarboxylic acid and salts thereof, and thereafter mixing to obtain intimate association thereof.

2. In a process for the production of improved pigments the steps which comprise adding to a white inorganic pigment material between about 0.05% and about 2%, calculated as benzenecarboxylic acid and based upon the weight of said pigment material, of a member selected from the group consisting of benzenecarboxylic acid and salts thereof, and thereafter mixing to obtain intimate association thereof.

3. In a process for the production of improved pigments the steps which comprise adding to a white inorganic compound of calcium between about 0.1% and about 1%, calculated as benzenecarboxylic acid and based upon the weight of said pigment material, of a member selected from the group consisting of benzenecarboxylic acid and salts thereof, and thereafter mixing to obtain intimate association thereof.

4. In a process for the production of improved pigments the steps which comprise adding to a calcium sulfate containing pigment between about 0.1% and about 1%, calculated as benzenecarboxylic acid and based upon the weight of said pigment material, of a member selected from the group consisting of benzenecarboxylic acid and salts thereof, and thereafter mixing to obtain intimate association thereof.

5. In a process for the production of improved pigments the steps which comprise adding to a pigment material between about 0.05% and about 2%, based upon the weight of said pigment material, of benzenecarboxylic acid, and thereafter mixing to obtain intimate association thereof.

6. In a process for the production of improved pigments the steps which comprise adding to a pigment material between about 0.05% and about 2%, calculated as benzenecarboxylic acid and based upon the weight of said pigment material, of a salt of benzenecarboxylic acid, and thereafter mixing to obtain intimate association thereof.

7. In a process for the production of improved pigments the steps which comprise adding to a calcium sulfate containing pigment between about 0.25% and about 0.75%, based upon the weight of said pigment material, of benzenecarboxylic acid, and thereafter dry-milling to obtain intimate association thereof.

8. In a process for the production of improved pigments the steps which comprise adding to a calcium sulfate containing pigment between about 0.25% and about 0.75%, calculated as benzenecarboxylic acid and based upon the weight of said pigment material, of sodium benzenecarboxylate, and thereafter dry-milling to obtain intimate association thereof.

9. In a process for the production of improved pigments the steps which comprise adding to a calcium sulfate containing pigment between about 0.25% and about 0.75%, calculated as benzenecarboxylic acid and based upon the weight of said pigment material, of zinc benzenecarboxylate, and thereafter dry-milling to obtain intimate association thereof.

10. In a process for the production of improved pigments the steps which comprise adding to a pigment material between about 0.05% and about 2%, calculated as benzenecarboxylic acid and based upon the weight of said pigment material, of a member selected from the group consisting of benzenecarboxylic acid and salts thereof and thereafter subjecting the treated pigment to a pulverizing mill and then to a disintegrating mill thereby obtaining intimate association of the pigment and agent.

11. In a process for the production of improved pigments the steps which comprise adding to a pigment material between about 0.05% and about 2%, calculated as benzenecarboxylic acid and based upon the weight of said pigment material, of a member selected from the group consisting of benzenecarboxylic acid and salts thereof and thereafter subjecting the treated pigment to a ring roll mill equipped with air separator and then to a rotary hammer mill thereby obtaining intimate association of the pigment and the agent.

12. In a process for the production of improved pigments the steps which comprise adding to a calcium sulfate containing titanium dioxide pigment between about 0.25% and about 0.75%, based upon the weight of said pigment material of benzenecarboxylic acid, and thereafter subjecting the treated pigment to a ring roll mill equipped with air separator and then to a rotary hammer mill thereby obtaining intimate association of the pigment and agent.

13. In a process for the production of improved pigments the steps which comprise adding to a calcium sulfate containing titanium dioxide pigment between about 0.25% and about 0.75%, calculated as benzenecarboxylic acid and based upon the weight of said pigment material, of sodium benzenecarboxylate, and thereafter subjecting the treated pigment to a ring roll mill equipped with air separator and then to a rotary hammer mill thereby obtaining intimate association of the pigment and the agent.

14. In a process for the production of improved pigments the steps which comprise adding to a calcium sulfate containing titanium dioxide pigment between about 0.25% and about 0.75%, calculated as benzenecarboxylic acid and based upon the weight of said pigment material of zinc benzenecarboxylate, and thereafter subjecting the treated pigment to a ring roll mill equipped with air separator and then to a rotary hammer mill thereby obtaining intimate association of the pigment and agent.

HOWARD K. CARTER.